United States Patent
Fedyk et al.

(10) Patent No.: US 12,483,674 B2
(45) Date of Patent: Nov. 25, 2025

(54) DISPLAYING VIDEO CONFERENCE PARTICIPANTS IN ALTERNATIVE DISPLAY ORIENTATION MODES

(71) Applicant: GOOGLE LLC, Mountain View, CA (US)

(72) Inventors: Ryan Fedyk, Brooklyn, NY (US); Stéphane Hervé Loïc Hulaud, Stockholm (SE)

(73) Assignee: Google LLC, Mountain View, CA (US)

( * ) Notice: Subject to any disclaimer, the term of this patent is extended or adjusted under 35 U.S.C. 154(b) by 266 days.

(21) Appl. No.: 18/198,687

(22) Filed: May 17, 2023

(65) Prior Publication Data
US 2024/0388675 A1 Nov. 21, 2024

(51) Int. Cl.
*H04N 7/15* (2006.01)
*G06T 7/20* (2017.01)
*G06V 40/16* (2022.01)
*H04L 65/403* (2022.01)
*H04N 7/14* (2006.01)

(52) U.S. Cl.
CPC .............. *H04N 7/152* (2013.01); *G06T 7/20* (2013.01); *G06V 40/171* (2022.01); *H04L 65/403* (2013.01); *H04N 7/147* (2013.01); *H04N 7/15* (2013.01); *G06T 2210/12* (2013.01)

(58) Field of Classification Search
None
See application file for complete search history.

(56) References Cited

U.S. PATENT DOCUMENTS

| 11,082,661 B1* | 8/2021 | Pollefeys | H04N 7/15 |
| 2019/0065895 A1* | 2/2019 | Wang | G06V 40/172 |
| 2019/0215464 A1* | 7/2019 | Kumar | H04N 7/08 |
| 2020/0099889 A1* | 3/2020 | Sugihara | H04N 7/147 |
| 2021/0203879 A1 | 7/2021 | Faulkner et al. | |
| 2023/0121654 A1* | 4/2023 | Tangeland | H04L 65/764 348/14.07 |
| 2024/0054786 A1* | 2/2024 | Andresen | H04N 5/2628 |

FOREIGN PATENT DOCUMENTS

| WO | 2022078656 A1 | 4/2022 |
| WO | 2023064153 A1 | 4/2023 |

OTHER PUBLICATIONS

International Search Report and Written Opinion for International Application No. PCT/US2024/029531, mailed Sep. 25, 2024, 22 Pages.

* cited by examiner

*Primary Examiner* — Quoc D Tran
(74) *Attorney, Agent, or Firm* — Lowenstein Sandler LLP

(57) ABSTRACT

Systems and methods for determining whether to display video conference participants in first display mode are provided. A plurality of video streams from a plurality of client devices of a plurality of participants of a video conference are received. One or more visual features of one or more objects in each of the plurality of video streams is identified. Based on the identified one or more visual features, a determination is made whether to use a first display mode or a second display mode for one or more visual items of a plurality of visual items corresponding to the plurality of video streams in a rendered composition. The rendered composition of the plurality of visual items is caused to be displayed in a user interface of a client device of the plurality of client devices in accordance to the determined first display mode or second display mode.

20 Claims, 5 Drawing Sheets

DISPLAYING VIDEO CONFERENCE PARTICIPANTS IN ALTERNATIVE DISPLAY ORIENTATION MODES

TECHNICAL FIELD

Aspects and implementations of the present disclosure relate to displaying video conference participants in alternative display orientation modes.

BACKGROUND

A platform can enable users to connect with other users through a video or an audio-based virtual meeting (e.g., a conference call, or a video conference). The platform can provide tools that allow multiple client devices to connect over a network and share each other's audio data (e.g., a voice of a user recorded via a microphone of a client device) and/or video data (e.g., a video captured by a camera of a client device, or video captured from a screen image of the client device) for efficient communication. In some instances, multiple client devices can capture video and/or audio data for a user, or a group of users (e.g., in the same meeting room), during a meeting. The video and/or audio can then be displayed in a user interface of the participating client devices. For example, the platform can display video from each client device in a separate box (commonly referred to as a tile) in the user interface.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes receiving a plurality of video streams from a plurality of client devices of a plurality of participants of a video conference. The method further includes identifying one or more visual features of one or more objects in each of the plurality of video streams. The method further includes determining, based on the identified one or more visual features, whether to use a first display mode or a second display mode for one or more visual items of a plurality of visual items corresponding to the plurality of video streams in a rendered composition. The method further includes causing the rendered composition of the plurality of visual items to be displayed in a user interface of a client device of the plurality of client devices in accordance to the determined first display mode or second display mode.

In some implementations, the one or more objects include an image of a participant of the plurality of participants, and the one or more visual features comprise at least one of one or more body features or one or more facial features of the participant.

In some implementations, the one or more facial features of the participant include at least one of an eyeline, a lower face region, a nose, or an upper face region of the participant. In some implementations, the method further includes determining, based on the identified one or more visual features, at least one of an estimated face size or an estimated head size of the participant.

In some implementations, determining whether to use the first display mode or the second display mode for the one or more visual items in the rendered composition is based on a set of rules or an output of a trained machine learning model.

In some implementations, the method further includes cropping, based on the identified one or more visual features, the one or more visual items according to the determined first display mode or second display mode. The method further includes aligning, based on the identified one or more visual features, the one or more visual items. The method further includes generating the rendered composition including the one or more visual items.

In some implementations, the method further includes identifying a display size corresponding to the user interface. The method further includes identifying a set of layout templates corresponding to the display size. The method further includes selecting, based on the determination to use the first display mode or the second display mode for the one or more visual items in the rendered composition, a layout template of the set of layout templates. The method further includes generating the rendered composition according to the selected layout template.

In some implementations, the method further includes identifying, over a period of time, movements of a first participant of the plurality of participants. The method further includes removing a background of a first visual item corresponding to a first video stream responsive to determining that the movements satisfy a condition. The first video stream can include an image of the first participant. The background can be removed prior to providing the rendered composition.

In some implementations, the method further includes determining that a first video stream of the plurality of video streams includes an image of a subset of the plurality of participants. The method further includes generating, for a first participant in the subset, an additional visual item based on one or more visual features associated with the first participant. The additional visual item can include a cropped section of a first visual item corresponding to the first video stream in accordance to the determined first display mode or second display mode.

An aspect of the disclosure provides a system including a memory device and a processing device communicatively coupled to the memory device. The processing device performs operations including receiving a plurality of video streams from a plurality of client devices of a plurality of participants of a video conference. The processing device performs operations further including identifying one or more visual features of one or more objects in each of the plurality of video streams. The processing device performs operations further including determining, based on the identified one or more visual features, whether to use a first display mode or a second display mode for one or more visual items of a plurality of visual times corresponding to the plurality of video streams in a rendered composition. The processing device performs operations further including causing the rendered composition of the plurality of video streams to be displayed in a user interface of a client device of the plurality of client devices in accordance to the determined first display mode or second display mode.

In some implementations, the one or more objects include an image of a participant of the plurality of participants, and the one or more visual features comprise at least one of one or more body features or one or more facial features of the participant.

In some implementations, the one or more facial features of the participant include at least one of an eyeline, a lower face region, a nose, or an upper face region of the participant. In some implementations, the processing device performs operations that further include determining, based on the identified one or more visual features, at least one of an estimated face size or an estimated head size of the participant.

In some implementations, determining whether to use the first display mode or the second display mode for the one or more visual items in the rendered composition is based on a set of rules or an output of a trained machine learning model.

In some implementations, the processing device performs operations that further include cropping, based on the identified one or more visual features, the one or more visual items according to the determined first display mode or second display mode. The processing device performs operations that further include aligning, based on the identified one or more visual features, the one or more visual items. The processing device performs operations that further include generating the rendered composition that includes one or more visual items.

In some implementations, the processing device performs operations that further include identifying a display size corresponding to the user interface. The processing device performs operations that further include identifying a set of layout templates corresponding to the display size. The processing device performs operations that further include selecting, based on the determination to use the first display mode or the second display mode for the one or more visual items in the rendered composition, a layout template of the set of layout templates. The processing device performs operations that further include generating the rendered composition according to the selected layout template.

An aspect of the disclosure provides a computer program including instructions that, when the program is executed by a processing device, cause the processing device to perform operations including receiving a plurality of video streams form a plurality of client devices of a plurality of participants of a video conference. The processing device performs operations further including identifying one or more visual features of one or more objects in each of the plurality of video streams. The processing device performs operations further including determining, based on the identified one or more visual features, whether to use a first display mode or a second display mode for one or more visual items of a plurality of visual items corresponding to the plurality of video streams in a rendered composition. The processing device performs operations further including causing the rendered composition of the plurality of visual items to be displayed in a user interface of a client device of the plurality of client devices in accordance to the determined first display mode or second display mode.

In some implementations, the one or more objects include an image of a participant of the plurality of participants, and the one or more visual features comprise at least one of one or more body features or one or more facial features of the participant. In some implementations, the one or more facial features of the participant includes at least one of an eyeline, a lower face region, a nose, or an upper face region of the participant. In some implementations, the processing device performs operations further including determining, based on the identified one or more visual features, at least one of an estimated face size or an estimated head size of the participant.

In some implementations, determining whether to use the first display mode or the second display mode for the one or more video streams in the rendered composition is based on a set of rules or an output of a trained machine learning model.

In some implementations, the processing device performs operations further including cropping, based on the identified one or more visual features, the one or more visual items according to the determined first display mode or second display mode. The processing device performs operations further including aligning, based on the identified visual features, the one or more visual items. The processing device performs operations further including generating the rendered composition comprising the one or more visual items.

In some implementations, the processing device performs operations further including identifying a display size corresponding to the user interface. The processing device performs operations further including identifying a set of layout templates corresponding to the display size. The processing device performs operations further including selecting, based on the determination to use the first display mode or the second display mode for the one or more visual items in the rendered composition, a layout template of the set of layout templates. The processing device performs operations further including generating the rendered composition according to the selected layout template.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
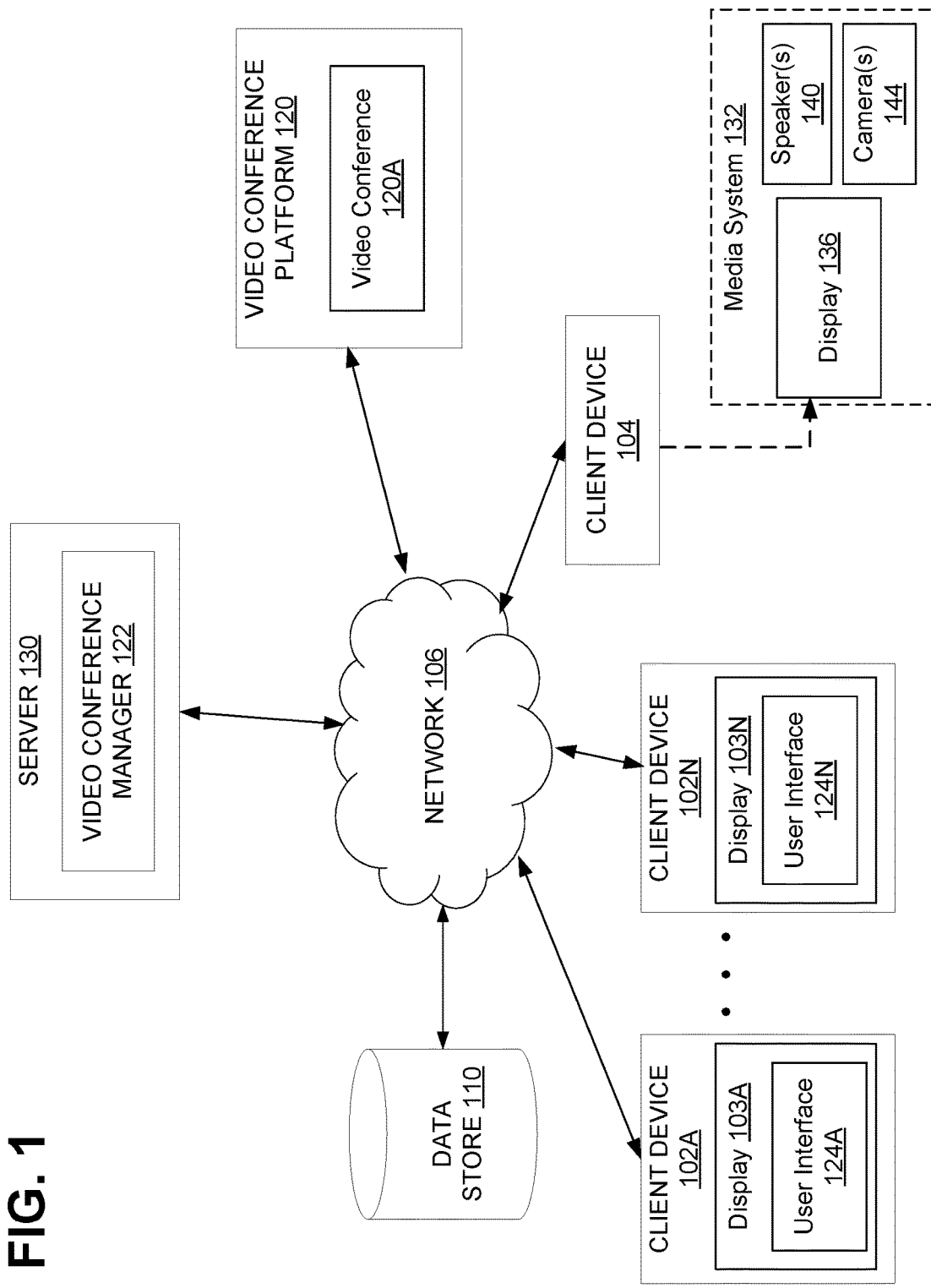
FIG. 1 illustrates an example system architecture, in accordance with implementations of the present disclosure.

Aspects of the present disclosure relate to providing a user interface (UI) for video conferencing that includes alternative display orientation modes. A video conference platform can enable video-based conferences between multiple participants via respective client devices that are connected over a network and share each other's audio (e.g., voice of a user recorded via a microphone of a client device) and/or video streams (e.g., a video captured by a camera of a client device) during a video conference.

Some conventional video conference platforms display video streams of the participants in a grid in a user interface. The video stream recorded by each participating device is displayed in a tile in the grid. The grid displays each participant's video stream as it is received (with minimal or no editing), in a landscape orientation. Landscape orientation is a horizontal orientation, in which the long sides of the rectangular tile are horizontal (at the top and bottom of the tile), and the short sides of the rectangular tile are vertical (at the sides of the tile). As the number of participants increases, the tiles are divided among multiple rows in the grid. For example, a video conference with two participants may display two landscape-oriented tiles side-by-side. If a third participant joins the video conference, a third landscape-oriented tile may be added on another row. As more participants join, more rows are added.

The video streams recorded by each client device are transmitted to other client devices, and/or to a server device for distribution to the other client devices participating in the video conference. Conventional video conference platforms transmit and display the raw, unedited, landscape-oriented video streams between client devices, and/or between client devices and a server device. These raw, unedited, landscape-oriented video streams recorded by each client device can be suboptimal. For example, one participant may be sitting far away from their camera, and thus their video stream can show their face, part of their body, and their surrounding environment. Since the area of interest in the participant's video stream is their face, transmitting a video stream that includes their surrounding environment results in unnecessary consumption of computing resources. As a result, transmitting and displaying the raw, unedited, landscape-oriented video streams decreases overall efficiency and increases overall latency of the video conference platform.

Furthermore, displaying landscape-oriented tiles spread across rows can result in inconsistent images between tiles. For example, while one participant may be sitting far away from their camera, another participant may be sitting very close to their camera. Thus, the tile for the first participant may show a small face, part of their body and their surrounding environment, and the tile for the second participant may show a closeup of the participant's face. Such inconsistencies between the video streams, displayed in landscape-oriented tiles spread over a number of rows of a user interface, can lead to an unnatural manner of communication. During meetings, nonverbal cues are often relied upon to convey meaning and build rapport between meeting participants. As a result of displaying landscape-oriented tiles spread across rows, participants often miss micro-gestures and micro-expressions of the other video conference participants. Micro-gestures and micro-expressions are subtle, fleeting movements and facial expressions that can help provide insights about a person's emotions and intentions. For example, while scanning the inconsistent images in the tiles spread across multiple rows to try to identify the speaker, participants may miss a subtle micro-expression or micro-gesture of another participant who is trying to break into the conversation. Such micro-expressions and micro-gestures, which may be noticeable in person, are lost in conventional video conference displays. Communicating in this unnatural manner can lead to video fatigue (i.e., the tiredness or burnout felt by users after hours of video conference meetings). Additionally, displaying raw, unedited video streams (e.g., that may unnecessarily include a participant's surrounding environment) results in an inefficient use of space on a client device (which can be especially problematic for small-screen client devices such as mobile phones and laptops, for example).

Implementations of the present disclosure address the above and other deficiencies by providing a variety of orientation modes for videoconferencing, in which the tiles of the user interface display can be in any number of display modes, and/or a combination of different display modes. A display (or orientation) mode can be portrait mode, landscape mode, square mode, or another orientation mode. Portrait orientation is a vertical orientation, in which the long sides of the rectangular tile are vertical (at the sides of the tile), and the short sides of the rectangular tile are horizontal (at the top and bottom of the tile). In some embodiments, the tiles of the user interface display consistent visual features (e.g., head size and aligned eyelines among the participants).

In some embodiments, a video conference includes multiple client devices. A client device can record and/or transmit a video stream for a single participant (e.g., the client device can be a personal laptop, computer, mobile phone, etc.), or a client device can record and/or transmit a video stream for multiple participants (e.g., the client device can be a video-conferencing device in a conference room). The video streams can be transmitted directly to other client devices, and/or can be transmitted to a server device that distributes the received video streams to other client devices participating in the video conference. In some embodiments, a client device can process, analyze, and/or crop objects/backgrounds in the video streams prior to transmitting the video streams. In some embodiments, the server device can process, analyze, and/or crop objects/backgrounds in the video streams received from client devices participating in the video conference. In other embodiments, the server device can process and analyze the video streams received from client devices participating in the video conference, crop visual items corresponding to the video streams, and/or generate a rendered composition of the visual items for presentation on the participating client devices. In yet other embodiments, a client device can process, analyze, and/or crop objects/backgrounds in video streams received from other client devices and/or from the server device. In still other embodiments, a client device can process and analyze the video streams received from other client devices and/or from the server device, crop visual items corresponding to the video streams, and/or generate a rendered composition of the visual items for presentation on the screen of the client device.

In some embodiments, a video conference manager can process, analyze, and/or crop objects/backgrounds in the video streams, which can include identifying visual features of the participant(s) in the video stream. If multiple participants are represented in one video stream, the video conference manager can identify a representation of each participant and segment (or crop) the video stream into multiple streams, one for each participant. The video conference manager can use the identified visual features (e.g., facial features such as eyeline, bottom of the head) to determine whether to display visual items (e.g., tiles) corresponding to the video streams in a portrait orientation, a landscape orientation, or a square orientation. In some embodiments, the video conference manager can use the identified visual features of the participants to identify an appropriate layout template that effectively displays the multiple visual items. For example, the appropriate layout can have the least amount of dead space, can provide a symmetrical distribution of space in the user interface, and/or can provide consistent views of the participants' faces. Dead space can include areas of the user interface that are unused or empty, or that display unnecessary backgrounds of the participants and/or visual items. The appropriate layout can display multiple visual items corresponding to visual streams of participants in portrait-mode in a single row. In some embodiments, the appropriate layout can be customized to the display settings of each client device (e.g., the monitor size, whether the video conference is in full-screen mode, etc.).

In some embodiments, the video conference manager can use the identified visual features (e.g., eyeline, bottom of the head) to determine the area of interest in each video stream. The area of interest can include just the participant's head, or the participant's head plus a small border around the head. The area of interest can have predetermined specifications, such as a head-size range, and/or an eyeline location. The video conference manager can use the identified visual features to estimate the head size of the participant. The area of interest can be in a portrait orientation. The video conference manager can crop each participant's video stream according to the area of interest, removing any part of the frame that is outside the area of interest. The video conference manager can then either transmit the cropped video stream(s) to another device (e.g., to another client device, to a server device), and/or can generate a rendered composition of the video streams of all participants of the video conference. In some embodiments, the video conference manager can crop a video stream by cropping a visual item or a tile corresponding to the video stream in the graphical user interface. In other embodiments, the video conference manager can crop the video stream itself by removing part(s) of each frame of the video stream that are outside of the area of interest.

In generating the rendered composition, the video conference manager can align the eyelines of the participants, and can ensure that each participant's head is within the predetermined head-size range. In some embodiments, the video conference manager can use the identified appropriate layout to generate the rendered composition of the video conference participants. Thus, the rendered composition can include the multiple visual items corresponding to the video streams in portrait-mode in a row, in a layout that efficiently displays each participant's face and reduces the amount of dead space in the user interface. In some embodiments, the rendered composition can be customized based on the display settings of a client device. For example, if a client device has a wide monitor on which the video conference is in full-screen mode, the rendered composition can include many portrait-mode visual items side-by-side (e.g., can display 8 or more portrait-mode visual items of video streams side-by-side). As another example, if a client device has a small monitor, or is not viewing the video-conference in full-screen mode, the rendered composition can include fewer portrait-mode visual items of video streams side-by-side, or can display some visual items in portrait mode and some in landscape mode on a second row.

In embodiments, the video conference manager can continually (e.g., every 2 seconds) analyze the video streams of the participants, and can update the crop of the video stream and/or visual item to keep the participants within the portrait-mode tile in the user interface. The video conference manager can gradually readjust the crop to a participant's movements, to account for drastic yet temporary movements outside of the designed portrait-mode tile. In some embodiments, the video conference manager can remove or replace the background of one or more of the participants, video streams, and/or visual items, to help avoid the potential disorientation caused by continuous crop adjustments.

Aspects of the present disclosure provide technical advantages over previous solutions. Aspects of the present disclosure can provide the additional functionality of displaying video streams of the video conference participants in cropped, portrait-oriented visual items or tiles in the user interface. Each participant's video stream can be cropped to display consistent head sizes and aligned eyelines among all participants. Cropping the video streams can include selecting the portion of the video stream that includes the participant's head, and removing the areas surrounding the participant's head (e.g., the participant's lower body, excessive space over the participant's head, views of the participant's surrounding environment, etc.). Thus, a cropped portion of the video stream is transmitted and displayed in the user interface. This functionality can result in a more efficient use of the processing resources utilized to facilitate the connection between the client devices by avoiding consumption of computing resources needed to transmit uncropped video streams. As a result, the overall efficiency of the video conference platform is increased, and the overall latency of the video conference platform is decreased. Furthermore, displaying video streams of the video conference participants in cropped, portrait-oriented tiles results in more efficient use of space on client devices, which can be especially beneficial for small-screen client devices such as mobile phones and laptops, for example.

FIG. 1 illustrates an example system architecture 100, in accordance with implementations of the present disclosure. The system architecture 100 (also referred to as "system" herein) includes client devices 102A-N, one or more client devices 104, a data store 110, a video conference platform 120, and/or a server 130, each connected to a network 106.

In implementations, network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by video conference platform 120 or one or more different machines (e.g., the server 130) coupled to the video conference platform 120 via network 106. In some implementations, the data store 110 can store portions of audio and video streams received from the client devices 102A-N for the video conference platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-N and/or concurrently editable by the users.

Video conference platform 120 can enable users of client devices 102A-N and/or client device(s) 104 to connect with each other via a video conference (e.g., a video conference 120A). A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Embodiments of the present disclosure can be implemented with any number of participants connecting via the video conference (e.g., from two participants up to one hundred or more).

The client devices 102A-N can each include computing devices such as personal computers (PCs), laptops, mobile phones, smart phones, tablet computers, netbook computers, network-connected televisions, etc. In some implementations, client devices 102A-N can also be referred to as "user devices." Each client device 102A-N can include an audiovisual component that can generate audio and video data to be streamed to video conference platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data (e.g., a video stream) of the captured data of the captured images.

In some embodiments, video conference platform 120 is coupled, via network 106, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 106). Users that are physically present in the room can use media system 132 rather than their own devices (e.g., client devices 102A-N) to participate in a video conference, which may include other remote users. For example, the users in the room that participate in the video conference may control the display 136 to show a slide presentation or watch slide presentations of other participants. Sound and/or camera control can similarly be performed. Similar to client devices 102A-N, client device(s) 104 can generate audio and video data to be streamed to video conference platform 120 (e.g., using one or more microphones, speakers 140 and cameras 144).

Each client device 102A-N or 104 can include a web browser and/or a client application (e.g., a mobile application, a desktop application, etc.). In some implementations, the web browser and/or the client application can present, on a display device 103A-103N of client device 102A-N, a user interface (UI) (e.g., a UI of the UIs 124A-N) for users to access video conference platform 120. For example, a user of client device 102A can join and participate in a video conference via a UI 124A presented on the display device 103A by the web browser or client application. A user can also present a document to participants of the video conference via each of the UIs 124A-N. Each of the UIs 124A-N can include multiple visual items corresponding to video streams of the client devices 102A-N provided to the server 130 for the video conference. A visual item can refer to a UI element that occupies a particular region in the UI and is dedicated to presenting a video stream from a respective client device. Such a video stream can depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, etc.

In some implementations, server 130 can include a video conference manager 122. Video conference manager 122 is configured to manage a video conference between multiple users of video conference platform 120. In some implementations, video conference manager 122 can provide the UIs 124A-N to each client device to enable users to watch and listen to each other during a video conference. Video conference manager 122 can also collect and provide data associated with the video conference to each participant of the video conference. In some implementations, video conference manager 122 can provide the UIs 124A-N for presentation by a client application (e.g., a mobile application, a desktop application, etc.). For example, the UIs 124A-N can be displayed on a display device 103A-103N by a native application executing on the operating system of the client device 102A-N or the client device 104. The native application may be separate from a web browser.

An audiovisual component of each client device can capture images and generate video data (e.g., a video stream) of the captured data of the captured images. In some implementations, the client devices 102A-N and/or client device(s) 104 can transmit the generated video stream to video conference manager 122. In some implementations, the client devices 102A-N, 104 can transmit the generated video stream directly to other client devices 102A-N, 104 participating in the video conference. The audiovisual component of each client device can also capture an audio signal representing speech of a user and generate audio data (e.g., an audio file or audio stream) based on the captured audio signal. In some implementations, the client devices 102A-N and/or client device(s) 104 can transmit the generated audio data to video conference manager 122, and/or directly to other client devices 102A-N, 104.

In some embodiments, the video stream generated by client device 102A-N and/or client device(s) 104 can include audio only. For example, the camera of the client device capturing the video stream can be turned off. As another example, the camera lens can be covered. In such embodiments, the video conference manager 122 can determine not to include the video stream in the rendered composition. Alternatively, the video conference manager 122 can provide an optional avatar to display in the rendered composition. An avatar can be a graphical representation or digital character that represents a participant. In some embodiments, the video conference manager 122 can process the video stream displaying an avatar in the same manner as the other video streams. For example, the video conference manager 122 can process, analyze, and/or crop the video stream displaying an avatar to align the eyeline of the avatar with the eyeline(s) of the other participant(s) or avatar(s), and/or to align the head size of the avatar with the head size(s) of the other participant(s) or avatar(s).

In some embodiments, the client devices 102A-N, 104 participating in the video conference can transmit video streams (including audio data) to server 130. The server 130 can execute a video conference manager 122 that can process, analyze and/or crop the video streams and/or visual items to identify visual features of the participant(s) represented in the received video streams. The video conference manager 122 can determine whether to display the video streams, visual items, and/or the participants in a number of display mode orientations (e.g., portrait mode, landscape mode, square mode, and/or a combination thereof). The video conference manager 122 can crop the video streams according to the display mode determination, and can generate a rendered composition that includes either the video streams and/or visual items in the determined display mode orientation. In some embodiments, the video streams can have differing display mode orientations. For example, some of the video streams and/or visual items can be in portrait mode, some can be in landscape, and/or some can be in square mode. Displaying the video streams and/or visual items in a variety of display mode orientations can maximize the display space available in the user interface. The video conference manager 122 can provide the rendered composition of the visual items for display in a user interface of the client devices 102A-N, 104 participating in the video conference. The video conference manager 122 is further described with respect to FIG. 2.

In some embodiments, a client device 102A-N, 104 can process and analyze the video stream to identify visual features of object(s) in the video streams. An object can be an image of a participant in the video stream (and/or of one of the multiple participants represented in the video stream). The visual features can include body feature(s) and/or facial feature(s) of the participant. The client device can crop the video stream according to the visual features, and can send the cropped video stream(s) to the video conference manager 122 of server 130. The video conference manager 122 can distribute the received video streams to the client devices 102A-N, 104 participating in the video conference. The video conference manager 122 can generate a rendered composition of the received video streams, and can distribute the rendered composition to the client devices 102A-N, 104 participating in the video conference. The rendered composition can be unique for each client device 102A-N, 104, e.g., based on the display settings of the user interface of the client device.

In some embodiments, a client device 102A-N, 104 can process and analyze the video stream to identify visual features (e.g., body feature(s) and/or facial feature(s)) of object(s) in the video stream. The client device 102A-N, 104 can then generate instructions indicating area(s) of the video stream that represent the object(s) (e.g., the participant(s)). The client device 102A-N, 104 can send the video stream, along with the instructions, to the video conference manager 122 of server 130. The video conference manager 122 can execute the instructions to generate a cropped video stream, and can distribute the cropped video streams to the client devices 102A-N, 104 participating in the video conference. The video conference manager 122 can also generate a rendered composition of the cropped video streams. In some embodiments, the video conference manager 122 transmits the video streams to the client device 102A-N, 104 participating in the video conference, along with the instructions to crop each video stream.

In some embodiments, a client device 102A-N, 104 can process and analyze the video stream to identify visual features of the object(s) in the video stream. The client device 102A-N, 104 can then crop the video stream according to the identified visual features, and can transmit the cropped video stream directly to the other client devices 102A-N, 104 participating in the video conference. The client device 102A-N, 104 can receive cropped video streams from the client devices 102A-N, 104 participating in the video stream, and can display the cropped video streams in display 103A-N, 136.

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It should be noted that in some other implementations, the functions of server 130 or video conference platform 120 may be provided by a fewer number of machines. For example, in some implementations, server 130 may be integrated into a single machine, while in other implementations, server 130 may be integrated into multiple machines. In addition, in some implementations, server 130 may be integrated into video conference platform 120.

In general, functions described in implementations as being performed by video conference platform 120 or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations may also be generally applied to any type of telephone call or conference call between users. Implementations of the disclosure are not limited to video conference platforms that provide video conference tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2:
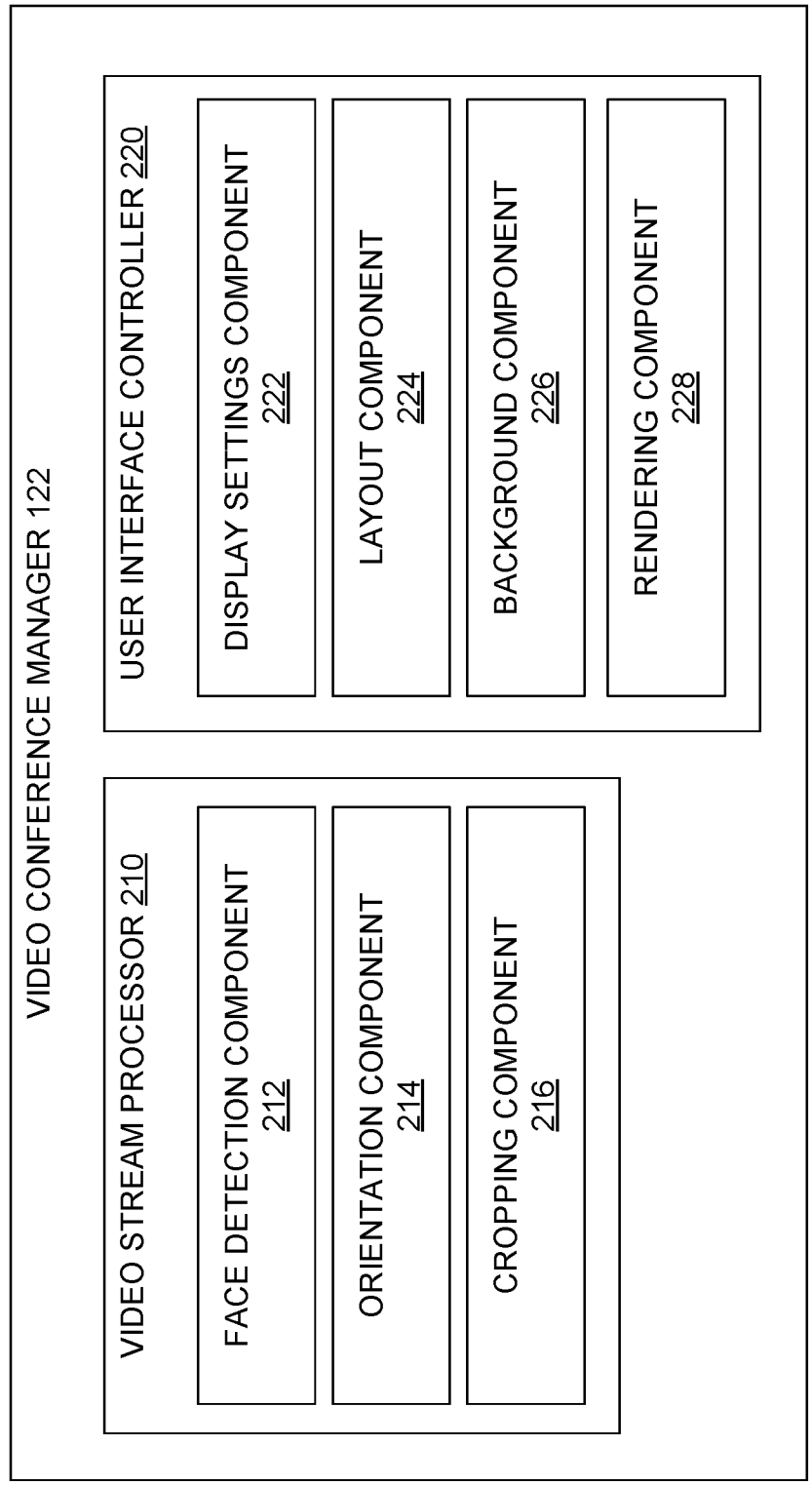
FIG. 2 is a block diagram illustrating an example video conference manager, in accordance with implementations of the present disclosure.

FIG. 2 is a block diagram illustrating an example video conference manager 122, in accordance with implementations of the present disclosure. The video conference manager 122 includes a video stream processor 210 and a user interface (UI) controller 220. The components 210-220 can be combined together or separated into further components, according to a particular implementation. It should be noted that in some implementations, various components of the video conference manager 122 may run on separate machines. In embodiments, each of the components may be or include logic configured to perform a particular action or set of actions. In embodiments, one or more of the components may be combined into a single component. In embodiments, the functions of one or more components may be divided into sub-components.

The video stream processor 210 can receive video streams from the client devices (e.g., from client devices 102A-N and/or 104). The video streams can include video footage (e.g., image frames) of the participants of a video conference. For example, the received video streams can include one video stream from client device 104 that includes footage of multiple participants in a conference room. The video stream processor 210 can identify the multiple participants in the video stream, and can crop the video stream into multiple sub-streams, each sub-stream representing one participant. The sub-streams can be grouped with the other video stream(s) received by video stream processor 210, and can be processed by one or more component 212-228. As another example, the received video streams can include footage from client devices 102A-N, each client device 102A-N providing a video stream for a single participant of the video conference.

The video stream processor 210 can include a face detection component 212, an orientation component 214, and/or a cropping component 216. The face detection component 212 can identify visual features (e.g., body feature(s) and/or facial feature(s)) of object(s) in the video streams. The object can be an image of a participant in the video stream. The body features can include, for example, the torso, shoulders, head, and/or other features of the participant's body. In some embodiments, the face detection component 212 can use facial recognition to identify a number of facial features for each participant. Examples of facial features include the eyeline, the nose, the upper face region, the lower face region, the location of the mouth, and other such features. The upper face region can include, for example, the forehead, or an area surrounding the forehead. The lower face region can include, for example, the chin, or an area surrounding the chin. Using the identified facial features, the face detection component 212 can determine an estimated head size and/or an estimated face size of each participant. As an illustrative example, to determine an estimated head size for a participant, the face detection component 212 can use proportional measurements applicable to the average human body (e.g., based on predefined metrics). In some embodiments, the face detection component 212 can determine that a face is not present in a video stream. In such a case, the face detection component 212 can determine not to include the video stream that does not include a face in the rendered composition. Alternatively, the face detection component 212 can provide an avatar to display in the video that does not include an identified face. The avatar can represent the participant. In some embodiments, a user can select their avatar.

The orientation component 214 can determine which orientation mode to use for the video stream(s), visual item(s), and/or for the participants represented in the video stream(s). Example orientation modes include portrait mode, landscape mode, square mode, and/or a combination thereof. The orientation component 214 can use a set of rules to determine which orientation mode to use. For example, the orientation component 214 can determine whether the quality of the video stream satisfies a minimum quality criterion in order to effectively crop the video stream in portrait mode. In some embodiments, the orientation component 214 can identify the areas of interest in the video stream surrounding the identified facial features. An area of interest can include the facial features and a border or bounding box surrounding the facial features. The bounding box can be in portrait mode, and can position the facial features within the bounding box so that the size of the head satisfies a criterion, and so that the eyeline is within a specified range in the box.

In some embodiments, the face detection component 212 and/or the orientation component 214 can use a trained machine learning model to identify the facial features, identify the area(s) of interest of the video stream, and/or determine which display orientation mode(s) to use. The machine learning model can be trained using a training dataset that includes video streams of one or multiple participants in a video conference, labeled with identified facial features and/or bounding boxes that crop each participant's head to a specific size and align the eyeline within a certain range. The face detection component 212 and/or orientation component 214 can then use the trained machine learning to identify facial features of received video streams, and/or to determine the orientation mode for the participants represented in the one or more video streams (including the bounding boxes).

The cropping component 216 can crop each video stream according to the visual features (e.g., facial feature(s) and/or body feature(s)) identified by face detection component 212, and/or according to the orientation component 214. For example, the cropping component 216 can crop each video stream according to the bounding box. Cropping a video stream can include removing or cutting out a portion of the video frame to focus on a specific area of the image represented in the video stream (i.e., the area of interest surrounding the identified facial features). The cropped video stream can have a smaller frame size, and can display only the remaining portion of the frame after the crop (i.e., only the portion within the bounding box). The cropping component 216 can continuously (e.g., every 2 seconds) update the crop of the video stream to keep the participant within the cropped area. In some embodiments, the cropping component 216 can gradually update the cropped area if a participant has moved outside of the cropped area. That is, the cropping component 216 can make small, incremental updates to the cropped area over a period of time, to achieve a target cropped area according to the identified facial features. For example, the cropping component 216 can update the cropped area by a maximum threshold amount per time period (e.g., per half second, or per second). The maximum threshold amount can be a percentage or ratio of the cropped size. For example, the cropping component 216 can make gradual adjustments by updating the cropped area to an area within a range of the most recent cropped area over a period of time. Thus, rather than immediately updating the cropped area to a drastically different portion of the video stream (e.g., with no overlap between the current cropped area and the target cropped area), the cropping component 216 can gradually update the cropped area by a certain amount per period of time (e.g., by half an inch every half a second) toward the target cropped area based on the identified facial features. The gradual update can help avoid drastic movements that can be distracting or disorienting, and/or can help avoid re-cropping a video stream if a user makes a sudden but temporary movement outside of the cropped area (and quickly returns to the cropped area). In some embodiments, the cropping component 216 can determine not to gradually update the cropped area. For example, if the background of the video stream has been removed and/or replaced (e.g., by a monochromatic background), rapid adjustments of the cropping area may not be as distracting or disorienting. Thus, in such an example, the cropping component 216 can determine not to gradually update the cropped area, and/or can determine to update the cropped area less gradually than if the background has not been removed and/or replaced.

The UI controller 220 can provide the UI for a video conference. The UI controller 220 can provide a customized UI for each client device 102A-N, 104 participating the video conference. The UI controller 220 can include a display settings component 222, a layout component 224, a background component 226, and/or a rendering component 228.

The display settings component 222 can determine the settings for the user interface display of each client device 102A-N, 104 participating in the video conference. The display settings component 222 can identify the size of the monitor and/or the settings of the video conference, such as whether the video conference is being displayed in full-screen mode, or whether a participant is sharing their screen.

In some embodiments, the layout component 224 can identify a set of layout templates that correspond to the display settings identified by display setting component 222, and/or that correspond to the cropped video streams generated by cropping component 216. The layout templates can maximize the use of space for different combinations of display settings and participant criteria. As an illustrative example, a twenty-two inch monitor displaying a video conference with 5 participants in full-screen mode can use a layout template that displays each participant in portrait-mode side-by-side in one row (e.g., similar to the UI illustrated in FIG. 3). As another illustrative example, a thirty-four inch monitor displaying a video conference with 9 participants in full-screen mode can also use a layout template that displays each participant in portrait-mode side-by-side in one row. However a smaller monitor (e.g., 19 inches) displaying a video conference in which a participant is sharing their screen may use a layout template that displays some of the participants in portrait mode and some of the participants not in portrait mode (e.g., landscape mode, and/or square mode) surrounding the shared screen. In some embodiments, the layout component 224 can use a trained machine learning model to identify the most efficient layout template for the participants, participants' visual features, and/or display settings of the video streams. The machine learning model can be trained on historical screen layouts of video conferencing UIs (optionally with label data indicating efficiency of a particular layout).

The background component 226 can remove the background from the received video streams. The background component 226 can replace the background with a monochromatic background, or can impose a virtual background for all the participants. In some embodiments, the virtual background can be continuous among the participants. The background component 226 can analyze the received video streams, and can determine whether to remove and/or replace the background of one (or of more than one) of the video streams. For example, if a participant is repeatedly shifting, the resulting repeated cropping and re-focusing of the video stream to keep the participant's facial features aligned and within the cropped portrait tile may be distracting. Thus, the background component 226 can determine how many times, in a period of time, the participant has moved outside of a certain bounding box within the participant's video stream. If the number of times exceeds a threshold value, the background component 226 can determine to replace and/or remove the background for that participant. In some embodiments, the background component 226 can determine to remove or replace the background for all participants if a threshold number of participants are repeatedly shifting outside of their corresponding bounding box.

In some embodiments, the rendering component 228 can generate a rendered composition of the video streams by combining the video streams into a single, unified display. The rendering component 228 can then transmit the rendered composition to other client device(s) 102A-N, 104 participating in the video conference for display in the user interface of the client device.

In some embodiments, the rendering component 228 can generate instructions to generate a rendered composition. The instructions can include, for example, the identified visual features from face detection component 212, the orientation determination from orientation component 214, the cropping settings from cropping component 216, the layout selection from layout component 224, and/or the background modifications from background component 226. The rendering component 228 can then transmit the instructions to client devices 102A-N, 104. Thus, the rendering component 228 can control the video streams displayed by providing a command to the client devices 102A-N, 104 of FIG. 1 that indicates the layout of the video streams and/or visual item, including whether the video streams and/or visual items are in portrait or landscape mode (or a combination thereof).

Figure 3:
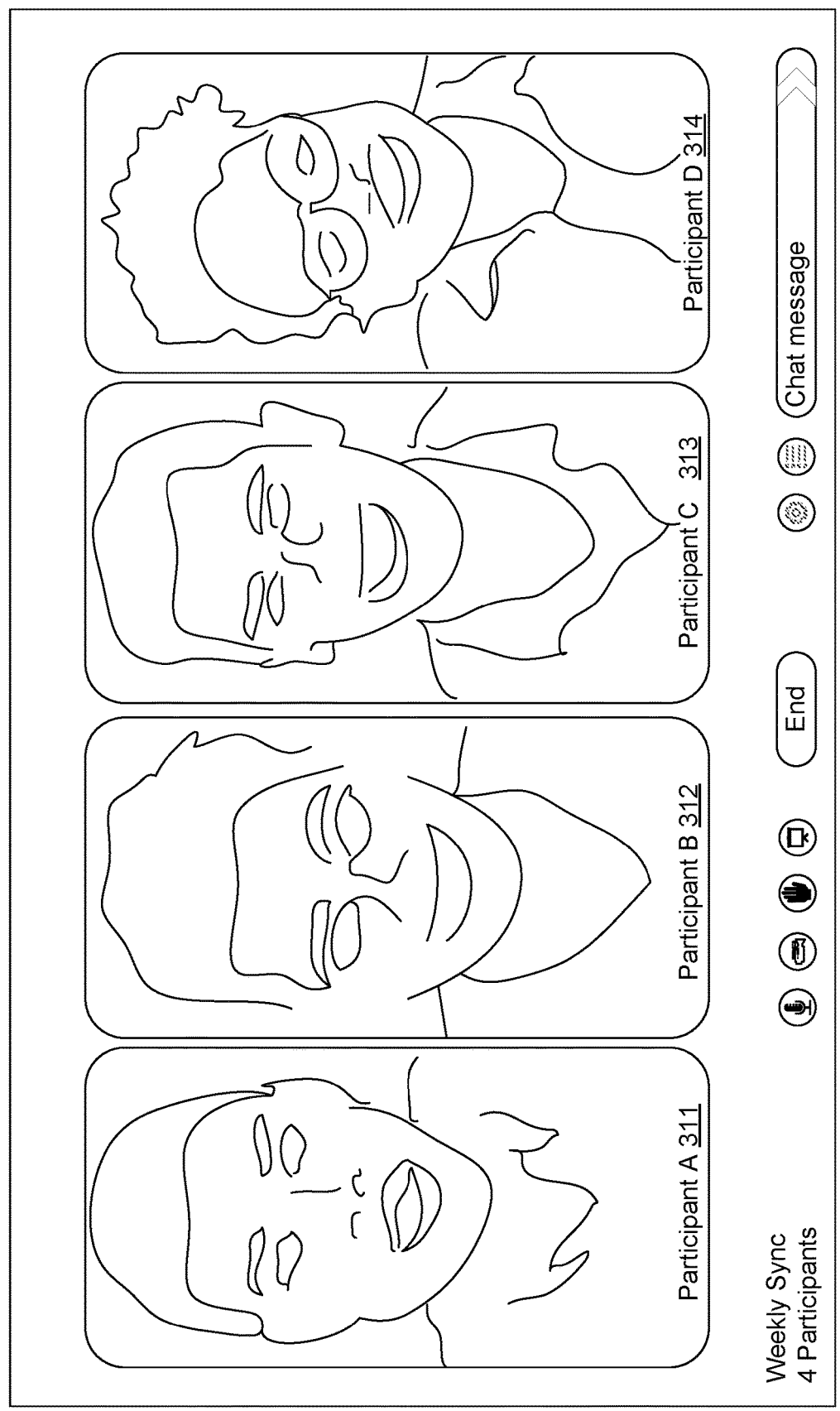
FIG. 3 illustrates an example user interface (UI) of a video conference, in accordance with implementations of the present disclosure.

FIG. 3 illustrates an example user interface 300 for a video conference, in accordance with some embodiments of the present disclosure. The UI 300 can be generated by the video conference manager 122 of FIG. 1 for presentation at a client device (e.g., client devices 102A-N and/or 104). In some embodiments, the UI 300 can be generated by one or more processing devices of the server 130 of FIG. 1. In some embodiments, the UI 300 can be generated by client device 102A-N, 104 of FIG. 1. In some implementations, the video conference between multiple participants can be managed by the video conference platform 120.

As illustrated, the UI 300 can display a video stream corresponding to each participant A-D 311-314 in a portrait oriented tile (or visual item), with the eyelines aligned and the face sizes nearly matching. The eyelines of the participants can be aligned within a certain range of each other. By cropping the video streams corresponding to the participants tightly around each participant's face, and by aligning the eyelines, UI 300 provides a natural form of communication during a video conference. A participant can more easily direct their attention across multiple participants, making it less likely for micro-gestures and/or micro-expressions to go unnoticed. A UI such as UI 300 illustrated in FIG. 3 can promote empathy among the participants, which can help reduce the likelihood of video call fatigue. Additionally, as illustrated in FIG. 3, UI 300 maximizes the use of space in the user interface, with minimal dead space. By focusing on each participant's face, UI 300 avoids displaying the participant's background environment, which can be distracting and an inefficient use of display space.

Figure 4:
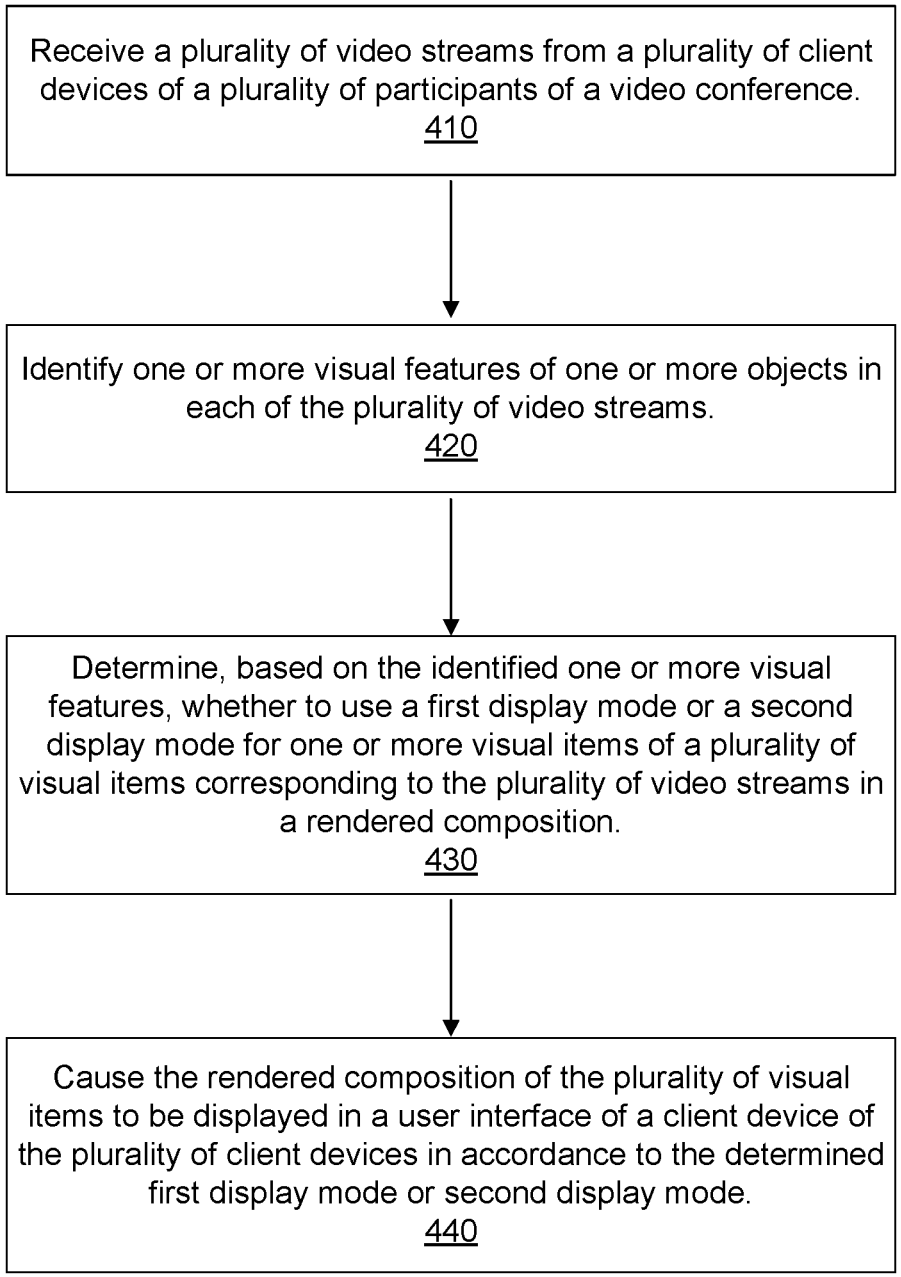
FIG. 4 depicts a flow diagram of a method the display orientation mode to display visual items corresponding to video streams participating in a video conference, in accordance with implementations of the present disclosure.

FIG. 4 depicts a flow diagram of a method 400 for determining the display orientation mode to display visual items corresponding to video streams participating in a video conference, in accordance with implementations of the present disclosure. Method 400 may be performed by processing logic that may include hardware (circuitry, dedicated logic, etc.), software (e.g., instructions run on a processing device), or a combination thereof. In one implementation, some or all the operations of method 400 may be performed by one or more components of system 100 of FIG. 1 (e.g., video conference platform 120, server 130, client device 102A-N, and/or 104, and/or video conference manager 122). In one implementation, some or all of the operations of method 400 may be performed client devices 102A-N, 104.

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification is capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 410, the processing logic receives a plurality of video streams from a plurality of client devices of a plurality of participants of a video conference. A video stream can be received from, for example, a client device 102A-N of FIG. 1, in which case the video stream can correspond to one participant of the video conference (e.g., the user of the client device 102A-N of FIG. 1). A video stream can be received from, for example, client device 104 of FIG. 1, in which case the video stream can represent one or more participants of the video conference. For example, client device 104 can be located within a physical conference or meeting room, and the video stream can include one participant in the room, or multiple participants in the room. The processing logic can identify the participants represented in the video stream, and can crop the video stream to create multiple video streams, each one representing a single participant. The video streams of the single participants may be grouped with the other one or more video streams received at block 410.

At block 420, processing logic identifies one or more visual features of one or more objects in each of the plurality of video streams. The one or more objects can include an image of a participant of the plurality of participants. The one or more visual features can include one or more body features, and/or one or more facial features of the participant. The body features can include, for example, the torso, shoulders, head, and/or other features of the participant's body. The processing logic can use facial recognition to identify, for example, the eyeline, the lower face region, the nose, the upper face region, or any other facial feature of the participant. The lower face region can include, for example, an area surrounding the chin of the participant, or a location of the bottom of the face. The upper face region can include, for example, the forehead of the participant, or a location of the top of the face. The processing logic can determine, for each participant, an estimated face size or an estimated size based on the identified visual features. For example, the processing logic can use the average proportions of a human face to determine an estimated face and/or head size based on the location of the eyeline and of the bottom of the face.

At block 430, processing logic determines, based on the one or more identified visual features, whether to use a first display mode or a second display mode for one or more visual items of the plurality of visual items corresponding to the plurality of video streams in a rendered composition. The first display mode can represent a portrait orientation, and the second display mode can represent a landscape orientation. In some embodiments, the processing logic can use a set of rules to determine whether to use first display mode or second display mode. In some embodiments, the processing logic can use the output of a trained machine learning model to determine whether to use first display mode or second display mode.

In some embodiments, the machine learning model can be trained using a training data set that includes video streams and/or visual items of video conference participants. The video streams and/or visual items in the training data set can be labeled with the areas of interest of each participant represented in the video stream and/or visual item. The area of interest can include, for example, the visual features (e.g., the eyeline, the bottom of the head), and/or a small border around each participant's face, indicating the optimal cropping area for each participant. Once trained, the processing logic can use the machine learning model to identify the visual features of the object(s) (e.g., image(s) of participant(s)) in each video stream and/or visual item, and to determine whether to use a first display mode or a second display mode for each participant, each video stream, and/or each visual item.

In some embodiments, the training data set can also include specific display settings used to display the user interface of the video conference on a client device. Thus, the determination of whether to use a first display mode or a second display mode can be dependent on the display settings of the user interface. The processing logic can input the received video stream(s) and/or visual item(s) as well as the display settings corresponding to a particular client device, and the machine learning model can output a determination of the visual features and whether to use a first display mode or a second display mode for each participant, each video stream, and/or each visual item.

In some embodiments, the processing logic can use a set of rules to determine whether to use the first display mode or the second display mode for the participants, for the video stream(s), and/or for the visual item(s). The set of rules can determine whether the video stream(s) and/or visual item(s) can be cropped in a first display mode to focus on the identified and/or determined visual features (e.g., eyeline and estimated head size). In some embodiments, the set of rules can also use the display settings of a client device to determine whether to use a first display mode or a second display mode for each participant, each video stream, and/or each visual item.

At block 440, processing logic causes the rendered composition of the plurality of visual items to be displayed in a user interface of a client device of the plurality of client devices (e.g., 102A-N, 104 of FIG. 1) in accordance to the determined first display mode or second display mode.

In some embodiments, the processing logic can crop the one or more visual items according to the determined first display mode or second display mode based on the identified one or more visual features. In some embodiments, the processing logic can identify one or more areas of interest in each video stream, and can crop each visual item according to the area(s) of interest. Each area of interest can correspond to identified visual features of a participant. The processing logic can crop the visual items according to predetermined specifications in order to provide consistent head size among the participants. In some embodiments, the processing logic can align the cropped one or more visual items based on the identified one or more visual features. For example, the processing logic can determine the location of the eyeline for each participant, and can align the cropped visual items in such a way that the eyeline of the participants are in line (or within a certain range of being in line). The processing logic can then generate the rendered composition by combining the aligned and cropped visual items (e.g., as illustrated in FIG. 3).

In some embodiments, the processing logic can identify a display size corresponding to the user interface of the client device. The display size can correspond to the size of the monitor(s) used to display the user interface of the video conference. In some embodiments, the display size can correspond to the setting used to display the user interface, such as whether the user interface is in full-screen mode, in a speaker mode (e.g., the video stream tile corresponding to the speaker is highlighted, or displayed larger than the other tiles), or whether a participant is sharing their screen), for example. The processing logic can identify a set of layout templates that correspond to the identified display size. The set of layout templates can also correspond to the number of participants represented in the video stream(s) and/or visual items. In some embodiments, each layout template can specify a number of participants to display in first display mode (e.g., portrait) and a number of participants to display in second display mode (e.g., landscape) in order to maximize the use of display space available in the user interface. As an illustrative example, a video conference with four visual items displayed in full-screen mode on a twenty-two inch monitor may maximize the use of display space by displaying four portrait-oriented visual items in one row (e.g., as illustrated in FIG. 3). As another illustrative example, a video conference with nine visual items displayed in full-screen mode on a twenty-two inch monitor may maximize the use of display space by displaying six portrait-oriented visual items in one row and three landscape-oriented visual items in a second row.

Based on the determination of whether to use the first display mode or the second display mode for the visual items in the rendered composition, the processing logic can identify one of the layout templates from the set of templates to use. The identified layout template can maximize the space used to display the participants, while minimizing the dead space. Furthermore, the identified layout template can provide large face sizes for each participant, and tight crop around each participant's face. The processing logic can then generate the rendered composition using the identified layout template. The processing logic can generate a customized rendered composition for each client device 102A-N, 104 participating in the video conference.

In some embodiments, the processing logic can identify movements of one of the participants of a period of time.

That is, the processing logic can monitor the movements of a participant in a video stream and/or visual item, and can determine whether the participant frequently moves in and out of a specific area in the video stream and/or visual item. In some embodiments, the processing logic can continually (e.g., every 2 seconds) identify the location of the identified visual features of one of the participants in a video stream and/or visual item, and can determine whether the location of the identified visual features moves outside of a predetermined area in a period of time (e.g., over the span of 10 seconds). Responsive to determining that the identified movements satisfy a condition (e.g., that the location of the identified visual features moves outside of the predetermined area over the period of time), the processing logic can remove the background of a visual item corresponding to a video stream that includes an image of the participant prior to providing the rendered composition. It can be disorienting when a participant frequently moves around during a video conference. Removing or replacing the background for such participants can help avoid the disorienting feeling.

In some embodiments, the processing logic can determine that a first video stream of the plurality of video streams includes images of a subset of the plurality participants. For example, the first video stream can be received from a client device 104 of FIG. 1 that is located in a physical meeting room, in which multiple participants of the video conference are located. Thus, the first video stream includes images of multiple participants. The processing logic can generate, for a first participant in the subset, based on one or more visual features associated with the first participant, an additional visual item comprising a cropped section of a first visual item corresponding to the first video stream in accordance to the determined first display mode or second display mode.

That is, the processing logic can generate additional visual items for each participant in the subset. Each additional visual item can include a cropped section of the first visual item corresponding to the first video stream. The cropped section can be determined based on the identified visual features. For example, the cropped section of the first video stream can include the identified visual features and a small border surrounding the visual features.

Figure 5:
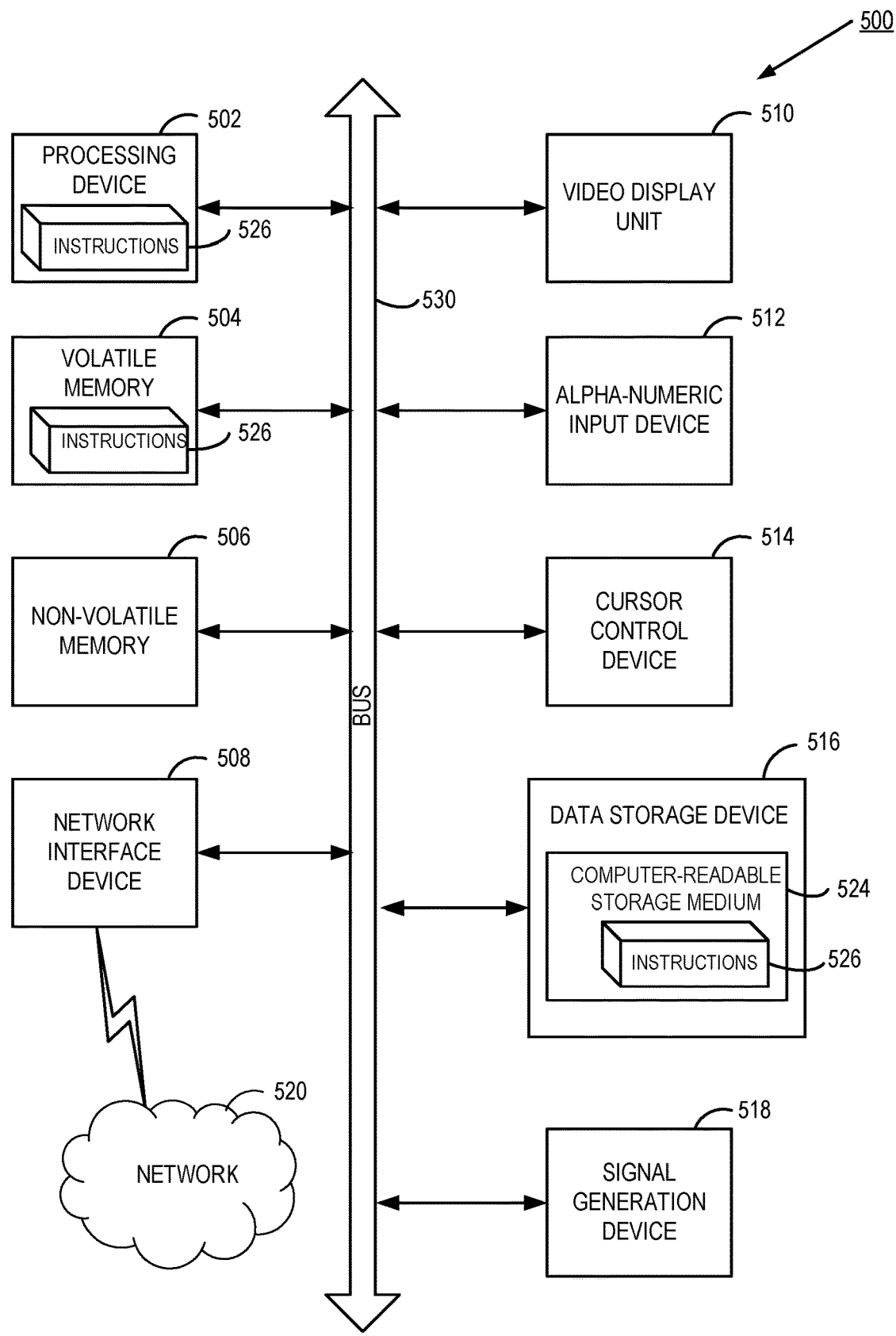
FIG. 5 is a block diagram illustrating an exemplary computer system, in accordance with implementations of the present disclosure.

FIG. 5 is a block diagram illustrating an exemplary computer system, in accordance with implementations of the present disclosure. The computer system 500 can be the server 130 or client devices 102A-N, 104 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 516, which communicate with each other via a bus 530.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 526 (e.g., for displaying video conference participants in alternative display modes) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 518 (e.g., a speaker).

The data storage device 516 can include a non-transitory machine-readable storage medium 524 (also computer-readable storage medium) on which is stored one or more sets of instructions 526 (e.g., for displaying video conference participants in alternative display modes) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 520 via the network interface device 508.

In one implementation, the instructions 526 include instructions for displaying video conference participants in alternative display modes. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   receiving a plurality of video streams from a plurality of client devices of a plurality of participants of a video conference;
   identifying one or more visual features of one or more objects in each of the plurality of video streams;
   determining, based on the identified one or more visual features, whether to use a first display mode of a plurality of display modes or a second display mode of the plurality of display modes for one or more visual items of a plurality of visual items corresponding to the plurality of video streams in a rendered composition, wherein the plurality of display modes comprises at least one of a portrait display mode or a landscape display mode; and
   causing the rendered composition of the plurality of visual items to be displayed in a user interface of a client device of the plurality of client devices in accordance to the determined first display mode or second display mode of the plurality of display modes.

2. The method of claim 1, wherein the one or more objects comprise an image of a participant of the plurality of participants, and the one or more visual features comprise at least one of one or more body features or one or more facial features of the participant.

3. The method of claim 2, wherein the one or more facial features of the participant comprise at least one of an eyeline, a lower face region, a nose, or an upper face region of the participant.

4. The method of claim 2, further comprising:
   determining, based on the identified one or more visual features, at least one of an estimated face size or an estimated head size of the participant.

5. The method of claim 2, further comprising:
   identifying, over a period of time, movements of a first participant of the plurality of participants; and
   responsive to determining that the movements satisfy a condition, removing a background of a first visual item corresponding to a first video stream comprising an image of the first participant prior to providing the rendered composition.

6. The method of claim 2, further comprising:
   determining that a first video stream of the plurality of video streams comprises images of a subset of the plurality of participants; and
   generating, for a first participant in the subset, based on one or more visual features associated with the first participant, an additional visual item comprising a cropped section of a first visual item corresponding to the first video stream in accordance to the determined first display mode or second display mode.

7. The method of claim 1, wherein determining whether to use the first display mode or the second display mode for the one or more visual items in the rendered composition is based on a set of rules or an output of a trained machine learning model.

8. The method of claim 1, further comprising:
   cropping, based on the identified one or more visual features, the one or more visual items according to the determined first display mode or second display mode;
   aligning, based on the identified one or more visual features, the one or more visual items; and
   generating the rendered composition comprising the one or more visual items.

9. The method of claim 1, further comprising:
   identifying a display size corresponding to the user interface;
   identifying a set of layout templates corresponding to the display size;
   selecting, based on the determination to use the first display mode or the second display mode for the one or more visual items in the rendered composition, a layout template of the set of layout templates; and
   generating the rendered composition according to the selected layout template.

10. A system comprising:
    a memory device; and
    a processing device coupled to the memory device, the processing device to perform operations comprising:
      receiving a plurality of video streams from a plurality of client devices of a plurality of participants of a video conference;
      identifying one or more visual features of one or more objects in each of the plurality of video streams;
      determining, based on the identified one or more visual features, whether to use a first display mode of a plurality of display modes or a second display mode of the plurality of display modes for one or more visual items of a plurality of visual items corresponding to the plurality of video streams in a rendered composition, wherein the plurality of display modes comprises at least one of a portrait display mode or a landscape display mode; and
      causing the rendered composition of the plurality of visual items to be displayed in a user interface of a client device of the plurality of client devices in accordance to the determined first display mode or second display mode of the plurality of display modes.

11. The system of claim 10, wherein the one or more objects comprise an image of a participant of the plurality of participants, and the one or more visual features comprise at least one of one or more body features or one or more facial features of the participant.

12. The system of claim 11, wherein the one or more facial features of the participant comprise at least one of an eyeline, a lower face region, a nose, or an upper face region of the participant, and wherein the processing device is to perform operations further comprising:
    determining, based on the identified one or more visual features, at least one of an estimated face size or an estimated head size of the participant.

13. The system of claim 10, wherein determining whether to use the first display mode or the second display mode for the one or more visual items in the rendered composition is based on a set of rules or an output of a trained machine learning model.

14. The system of claim 10, wherein the processing device is to perform operations further comprising:
    cropping, based on the identified one or more visual features, the one or more visual items according to the determined first display mode or second display mode;
    aligning, based on the identified one or more visual features, the one or more visual items; and generating the rendered composition comprising the one or more visual items.

15. The system of claim 10, wherein the processing device is to perform operations further comprising:
identifying a display size corresponding to the user interface;
identifying a set of layout templates corresponding to the display size;
selecting, based on the determination to use the first display mode or the second display mode for the one or more visual items in the rendered composition, a layout template of the set of layout templates; and
generating the rendered composition according to the selected layout template.

16. A non-transitory computer readable storage medium comprising instructions for a server that, when executed by a processing device, cause the processing device to perform operations comprising:
receiving a plurality of video streams from a plurality of client devices of a plurality of participants of a video conference;
identifying one or more visual features of one or more objects in each of the plurality of video streams;
determining, based on the identified one or more visual features, whether to use a first display mode of a plurality of display modes or a second display mode of the plurality of display modes for one or more visual items of a plurality of visual items corresponding to the plurality of video streams in a rendered composition, wherein the plurality of display modes comprises at least one of a portrait display mode or a landscape display mode; and
causing the rendered composition of the plurality of visual items to be displayed in a user interface of a client device of the plurality of client devices in accordance to the determined first display mode or second display mode of the plurality of display modes.

17. The non-transitory computer readable storage medium of claim 16, wherein the one or more objects comprise an image of a participant of the plurality of participants, and the one or more visual features comprise at least one of one or more body features or one or more facial features of the participant; wherein the one or more facial features of the participant comprise at least one of an eyeline, a lower face region, a nose, or an upper face region of the participant; and wherein the processing device is to perform operations further comprising:
determining, based on the identified one or more visual features, at least one of an estimated face size or an estimated head size of the participant.

18. The non-transitory computer readable storage medium of claim 16, wherein determining whether to use the first display mode or the second display mode for the one or more visual items in the rendered composition is based on a set of rules or an output of a trained machine learning model.

19. The non-transitory computer readable storage medium of claim 16, wherein the processing device is to perform operations further comprising:
cropping, based on the identified one or more visual features, the one or more visual items according to the determined first display mode or second display mode;
aligning, based on the identified one or more visual features, the one or more visual items; and
generating the rendered composition comprising the one or more visual items.

20. The non-transitory computer readable storage medium of claim 16, wherein the processing device is to perform operations further comprising:
identifying a display size corresponding to the user interface;
identifying a set of layout templates corresponding to the display size;
selecting, based on the determination to use the first display mode or the second display mode for the one or more visual items in the rendered composition, a layout template of the set of layout templates; and
generating the rendered composition according to the selected layout template.

* * * * *